United States Patent
Murphy

(10) Patent No.: US 7,890,073 B2
(45) Date of Patent: Feb. 15, 2011

(54) METHOD AND SYSTEM FOR DETECTING CARRIER WAVE DROPOUT

(75) Inventor: Ryan M. Murphy, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 690 days.

(21) Appl. No.: 11/906,113

(22) Filed: Sep. 28, 2007

(65) Prior Publication Data

US 2009/0088111 A1   Apr. 2, 2009

(51) Int. Cl.
*H04B 10/08* (2006.01)
*H04L 1/20* (2006.01)

(52) U.S. Cl. .................... 455/226.1; 375/346

(58) Field of Classification Search ............ 455/226.1, 455/226.2, 226.3, 296, 232.1, 230, 231; 370/342; 375/338, 340, 345, 346
See application file for complete search history.

(56) References Cited

U.S. PATENT DOCUMENTS

| 6,671,504 | B1 * | 12/2003 | Myers ....................... 455/212 |
| 7,286,506 | B2 * | 10/2007 | Abrishamkar et al. ........ 370/332 |
| 7,693,975 | B2 * | 4/2010 | Sanchez ..................... 709/223 |
| 2003/0227879 | A1 * | 12/2003 | Abrishamkar et al. ........ 370/320 |
| 2004/0223480 | A1 * | 11/2004 | Nguyen et al. .............. 370/342 |
| 2008/0037689 | A1 * | 2/2008 | Kurt et al. ................... 375/340 |
| 2008/0254788 | A1 * | 10/2008 | Wigren ....................... 455/423 |

\* cited by examiner

*Primary Examiner*—Blane J Jackson
(74) *Attorney, Agent, or Firm*—Matthew J. Evans; Daniel M. Barbieri

(57) ABSTRACT

A method for detecting carrier wave dropout may include but is not limited to: a) receiving a carrier wave; b) determining a carrier wave power; c) applying a Kalman filter to the carrier wave power; d) detecting a decrease in carrier wave power; and e) delaying a transmission of the carrier wave to a demodulator. A system for detecting carrier wave dropout may include, but is not limited to: a) circuitry for receiving a carrier wave; b) circuitry for determining a carrier wave power; c) circuitry for applying a Kalman filter to the carrier wave power; d) circuitry for detecting a decrease in carrier wave power; and e) circuitry for delaying a transmission of the carrier wave to a demodulator.

24 Claims, 4 Drawing Sheets

METHOD AND SYSTEM FOR DETECTING CARRIER WAVE DROPOUT

BACKGROUND

Today's high-assurance communications systems require near real-time transmissions of highly consistent data streams. Acquisition and maintenance of the subject data is an important and often difficult task for many modems. This is especially true for waveforms having higher data rates that employ complex modulations such as continuous-phase modulation (CPM). In ultra-high frequency (UHF) satellite communication (SATCOM) military waveform standards, several higher data rate waveforms are defined, for example MIL-STD-188-181B.

As such, modern systems require the ability to detect improprieties in data streams in order to take corrective measures to maintain the integrity of the communicated data. One possible source of data corruption may arise from carrier wave dropout. Carrier wave dropout may result from signal interference due to environmental noise or device failure. Regardless of the nature of the dropout, systems must be able to detect the dropout, reacquire the carrier wave, and discern between corrupted data resulting from the dropout and the desired accurate data.

Kalman filtering may be used to monitor carrier wave power and provide estimated power values based on historical state information when interference with a received signal occurs. However, certain Kalman filters, such as 0-order Kalman filters, are designed to measure constant values. As such, when a carrier power drops significantly, a 0-order Kalman filter diverges from steady-state and is no longer able to accurately track and estimate the signal.

Therefore, it would be desirable to provide a system and method for detecting carrier dropout utilizing a Kalman filter.

SUMMARY OF THE INVENTION

Accordingly, the present disclosures are directed to system and method for detecting carrier dropout.

A method in accordance with the present invention may comprise one or more of the following steps: a) receiving a carrier wave; b) applying a Kalman filter to the carrier wave; c) detecting a decrease in carrier wave power; d) delaying a transmission of the carrier wave to a demodulator.

A system for detecting carrier wave dropout may comprise one or more of: a) circuitry for receiving a carrier wave; b) circuitry for applying a Kalman filter to the carrier wave; c) circuitry for detecting a decrease in carrier wave power; d) circuitry for delaying a transmission of the carrier wave to a demodulator.

It is to be understood that both the foregoing general description and the following detailed description are exemplary and explanatory only and are not restrictive of the invention claimed. The accompanying drawings, which are incorporated in and constitute a part of the specification, illustrate various general embodiments of the invention and together with the general description, serve to explain the principles of the invention.

BRIEF DESCRIPTION OF THE DRAWINGS

The numerous objects and advantages of the present disclosures may be better understood by those skilled in the art by reference to the accompanying figures in which.

DETAILED DESCRIPTION

Figure 1:
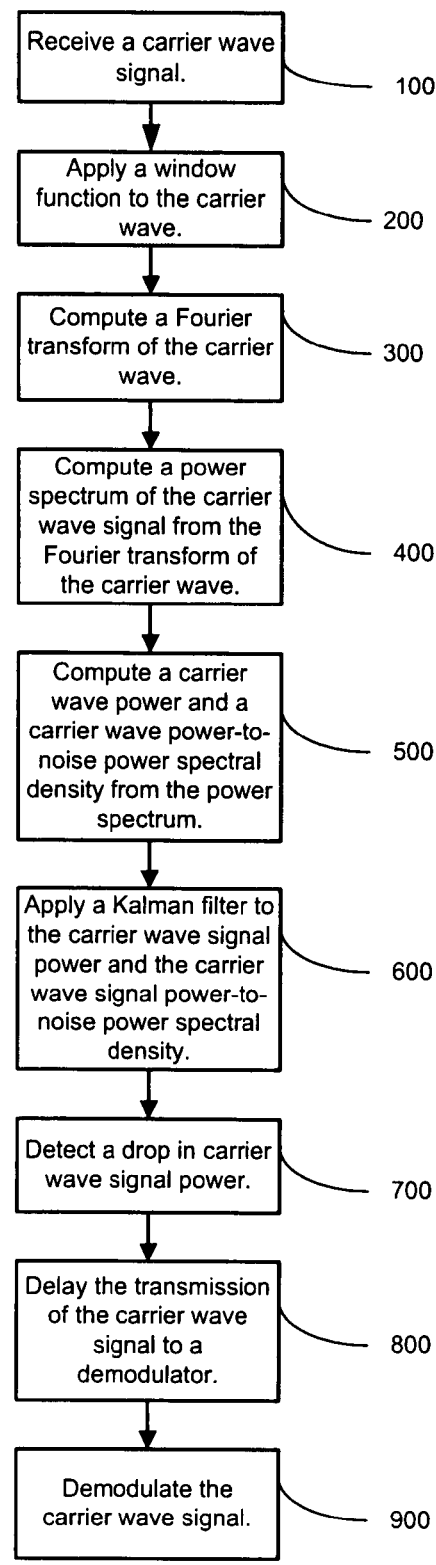
FIG. 1 depicts a flow diagram detailing a method for detecting carrier wave dropout.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

A system for detecting carrier power dropout using a complex Fast Fourier Transform (FFT), 0-Order Kalman filter, and sample delay line is disclosed.

Referring to FIG. 1, a process flow diagram detailing a method for carrier wave dropout detection is depicted. A complex electromagnetic signal having in-phase and quadrature (I/Q) components may be received at step 100. A window function may be applied to the complex signal at step 200. A window function (or apodization function) is a function that is zero-valued outside of one or more chosen intervals. Windowing of a waveform (such as $\cos(\omega t)$) causes its Fourier transform to have non-zero values (commonly called leakage) at various frequencies (such as $\omega$ for the function $\cos(\omega t)$). Such window functions may include Hamming, Hann and rectangular functions.

The I/Q components may be transformed into the frequency domain using a Fourier transform at step 300. The Fourier transform may be a complex fast Fourier transform (FFT). Various methods of carrying out an FFT may include Cooley-Tukey, prime factor, Bruun, Rader, and Bluestien FFT algorithms.

A power spectrum for the carrier wave may be computed from the Fourier transform of the carrier wave at step 400. A carrier wave power and carrier power-to-noise power spectral density (C/No) may be calculated using the power spectrum at step 500.

The carrier wave power and the C/No may be 0-order Kalman filtered at step 600. When the power of the received carrier wave drops, a 0-Order Kalman filter tracking that signal may diverge from steady-state and no long accurately track the signal. The amount of divergence may be controlled by adding additional process noise (Q) into the Kalman filter.

Figure 2:
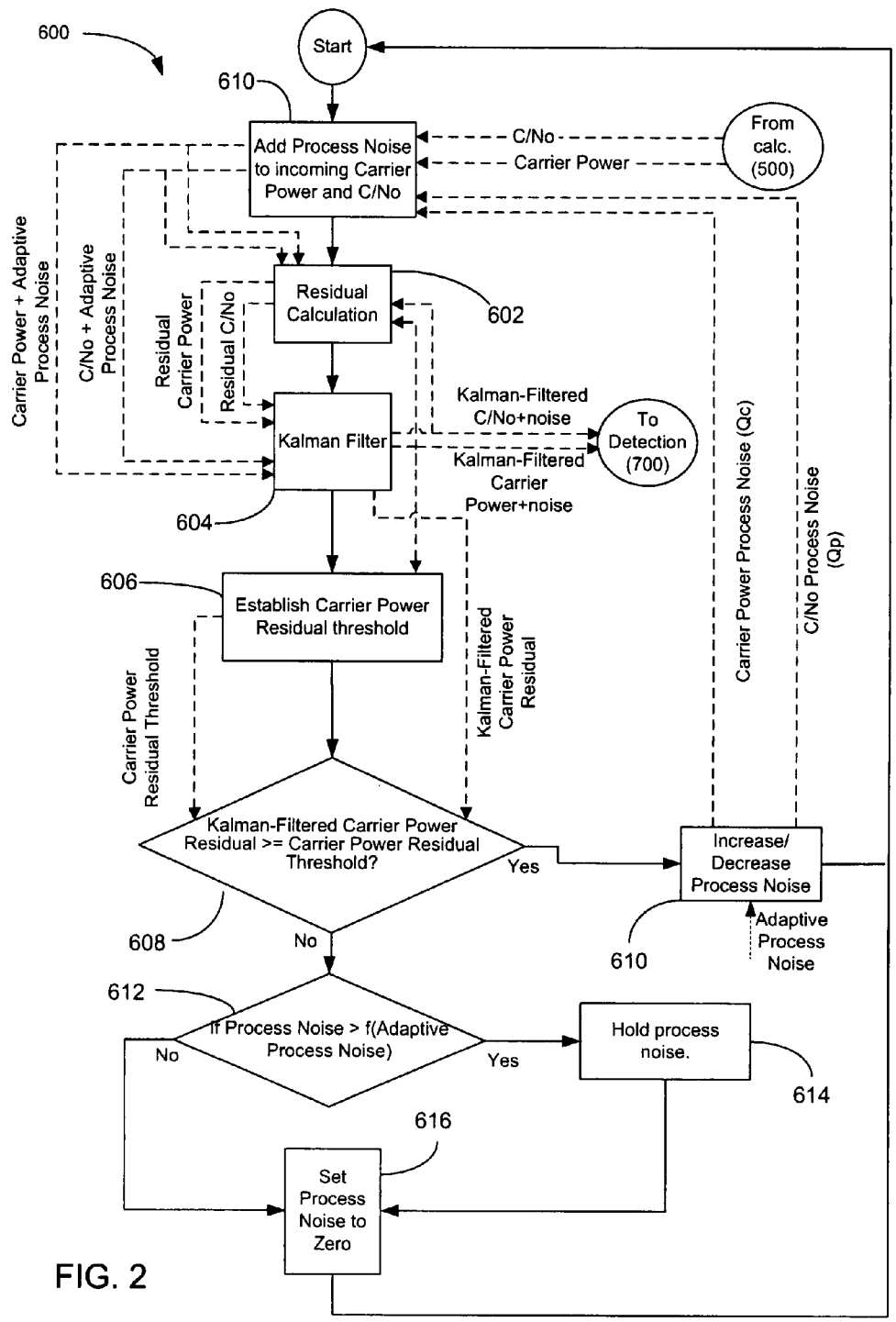
FIG. 2 depicts a flow diagram detailing a method for Kalman filtering a carrier wave.

Referring to FIG. 2, a process flow diagram further detailing a method of Kalman filtering 600 a signal is presented. The residual of the carrier power and the residual of C/No may be calculated from the present states of the carrier power and C/No (as determined in step 500) and the previous states of the carrier power and C/No at step 602. The previous state of the carrier power and C/No may be tracked and the present state of the carrier power and C/No may be estimated by a Kalman filter at step 604.

The Kalman-filtered carrier power may be used to calculate a residual carrier power threshold value for determining whether or not the total process noise should be increased at step 606. For example, the residual carrier power threshold value may be defined as one-half of the current Kalman-filtered carrier power.

The first threshold value may be compared to the absolute value of the Kalman-filtered residual of the carrier power at step 608. If the Kalman-filtered residual of the carrier power rises above the residual carrier power threshold, the amount of adaptive process noise may be increased and added to the next symbol of the incoming I/Q signal at step 610. Steps 602 through 610 may be repeated so as to accumulate process noise enabling the Kalman filter to track the changes in the incoming signal.

Once the absolute value of the Kalman-filtered residual carrier power drops below the first threshold value, it may be necessary to maintain the process noise at the increased level for a period of time to allow the Kalman filter time to converge on to a changing input signal. The value of a second threshold value may be utilized to dictate whether a hold is required at step 612.

For example, if the value of the total process noise (e.g. the base process noise in the carrier wave as well as that noise which was added as adaptive process noise at step 610) is greater than a second threshold, then the total process noise may be held constant for a predetermined length of time to allow the Kalman filter time to converge on a changing input signal at step 614. The second threshold may be a function of the adaptive process noise.

As such, if the first threshold is crossed at step 608 due to an abrupt spike in noise which is insufficient to induce a carrier wave drop, on average the amount of time that the spike remains above the first threshold level may not be long enough for the accumulated process noise to trip the second threshold and a hold will not occur. This accumulation-and-hold process allows the 0-Order Kalman filter to detect changes in carrier power and C/No faster than if a moving average with equivalent filtering was used in its place. The adaptive process noise may be reset to its initialization value at step 616.

Referring again to FIG. 1, the Kalman-filtered carrier power and C/No signals may be checked against respective carrier presence/dropout threshold values at step 700.

Figure 3:
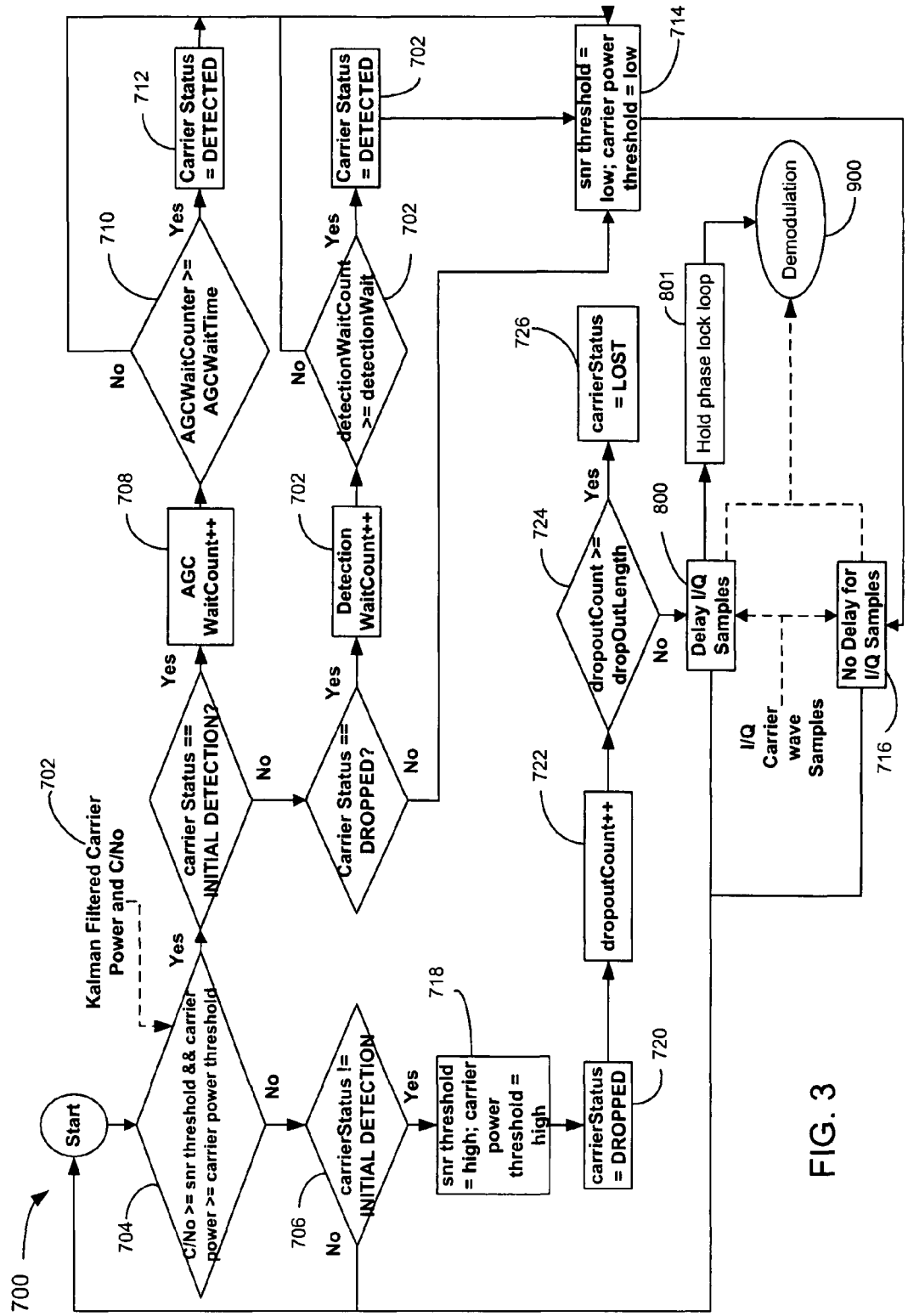
FIG. 3 depicts a flow diagram detailing a method for detecting carrier wave dropout.

Referring to FIG. 3 a process flow diagram for a method for detecting dropout of a carrier signal. The Kalman-filtered carrier power and C/No signals calculated at step 604 may be provided as inputs at step 702 to the carrier dropout detection process 700. The inputs may be compared to respective threshold values at step 704. If the Kalman-filtered carrier power and C/No are each less than their respective threshold values, it may indicate that the carrier signal strength is inadequate. Such a condition may be present when the carrier wave status is either in an INITIAL DETECTION state or a DROPPED state. Upon system startup the carrier wave status may be set to an INITIAL DETECTION state (not shown). The carrier wave status may be maintained at step 706 until both the Kalman-filtered carrier power and C/No have reached their threshold values as determined in step 704.

If the I/Q samples are noisy, an automatic gain control (AGC) may be in a "hold" state to enable an associated loop filter to drive the signal level to a desired range. In such a case, it may be necessary to wait a given period of time to allow the AGC to reach steady state before a valid signal may be detected. At steps 708 and 710, a counter and associated comparator may be utilized to track the number of process iterations determined to correspond to the period of time required for the AGC to reach steady state. Once the AGC has reached steady state, the carrier wave status may be set to a DETECTED state at step 712.

Upon reaching a DETECTED state for the carrier wave, the C/No and carrier power threshold values may be set to respective low values at step 714 so as to increase the sensitivity of the system to fluctuations in the carrier power and C/No of the I/Q samples. When the carrier wave remains in a DETECTED state indicating valid I/Q signal samples, the I/Q carrier wave samples may be provided to a demodulator without imparting a delay at step 716.

Referring again to step 704, when the Kalman-filtered carrier power and/or the C/No inputs 702 are less than their respective threshold values, it may indicate the carrier wave power has dropped and the I/Q samples currently being obtained are invalid. In such a case, the signal-to-noise threshold and the carrier power threshold values may be increased and the carrier status set to a DROPPED state at steps 718 and 720 respectively. Such an increase in the respective threshold values may be achieved by the addition of hysteresis so as to decrease the sensitivity of the system and to avoid rapid transitions between DETECTED and DROPPED carrier status states.

At steps 722 and 724, a counter and associated comparator may be utilized to track the number of occurrences of carrier power dropouts for the system. Should the number of occurrences or the aggregate time of carrier power dropout exceed a set threshold, it may indicate that the signal is irretrievable and the carrier status may be set to LOST at step 726 and I/Q sampling may be discontinued until the signal can be reinitialized. If the number or timing of carrier power dropouts remains within the threshold, it may indicate an isolated carrier power fluctuation necessitating a delay in transmitting I/Q samples to a demodulator at step to avoid processing invalid I/Q samples resulting from the carrier power dropout. The received I/Q samples may be delayed before demodulation at step 800. Additionally, after a signal dropout has been detected at step 704, the demodulator's carrier phase lock loop (PLL) may be held constant at step 801. Nominally, there may be some delay between when the signal fades and when the algorithm detects that it is dropped. In a dynamic environment, if the PLL is held constant on faded samples it may start to drift away from steady-state. After the system detects that the signal power has faded it may send a coast signal to the demodulator's PLL. The hold signal is sent prior to the faded samples propagating through the delay line. This allows the PLL to coast and regain lock on the valid samples.

Once the Kalman-filtered carrier power and C/No have returned above their respective thresholds at step 704, the system may delay the carrier status update at steps 730 and 732. At steps 730 and 732, a counter and associated comparator may be utilized to track the number of process iterations determined to correspond to the period of time required for the system to return to steady state following the detection of a carrier power drop. Once a period of time sufficient for the carrier power to return to steady state has occurred, the carrier status may again be set to DETECTED at step 734 and the I/Q samples may be provided to the demodulator without imparting a delay at step 716.

The carrier wave I/Q samples which are delayed at step 800 or allowed to proceed without delay at step 716 may be demodulated at step 900.

Similarly, the steps of the above described methods may be implemented as computer readable instructions which may be stored on a computer readable medium. These computer readable instructions may comprise firmware or software and may be executed by a processing device such as an application specific integrated circuit (ASIC) or a microprocessor.

Figure 4:
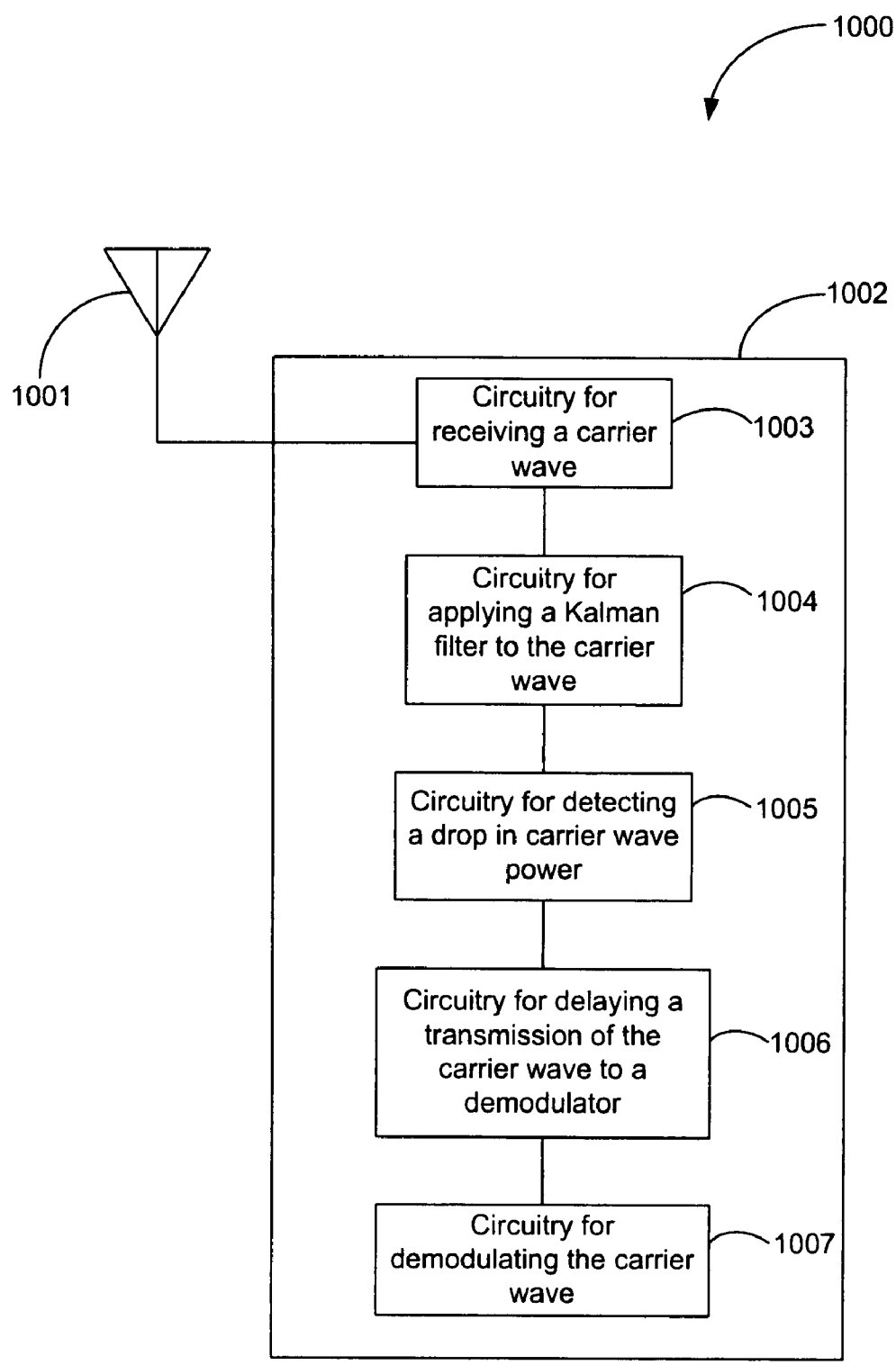
FIG. 4 depicts system for detecting carrier wave dropout is presented.

Further, the steps of the above described methods may also be implemented directly as circuitry for accomplishing the method, such as an ASIC. Referring to FIG. 4, a system 1000 for detecting carrier wave dropout is presented. The system may comprise means for receiving a carrier wave, such as an antenna 1001. The system may further comprise a computing device 1002. The computing device may comprise: circuitry for receiving a carrier wave 1003; circuitry for applying a Kalman filter to the carrier wave 1004; circuitry for detecting a decrease in carrier wave power 1005; circuitry for delaying a transmission of the carrier wave to a demodulator 1006; and circuitry for demodulating the carrier wave 1007.

One skilled in the art will recognize that the foregoing components (e.g., steps), devices, and objects in FIGS. 1-4 and the discussion accompanying them are used as examples for the sake of conceptual clarity and that various configuration modifications are common. Consequently, as used herein, the specific exemplars set forth in FIGS. 1-4 and the accompanying discussion are intended to be representative of their more general classes. In general, use of any specific exemplar herein is also intended to be representative of its class, and the non-inclusion of such specific components (e.g., steps), devices, and objects herein, or the order in which they are presented should not be taken as indicating that limitation is desired.

It is believed that the present invention and many of its attendant advantages will be understood from the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for detecting carrier wave dropout, the method comprising the steps:
   receiving a carrier wave;
   determining a carrier wave power;
   applying a Kalman filter to the carrier wave power;
   detecting a decrease in carrier wave power; and
   delaying a transmission of the carrier wave to a demodulator.

2. The method of claim 1, further comprising:
   applying a window function to the carrier wave.

3. The method of claim 1, further comprising:
   determining a carrier wave power-to-noise power spectral density.

4. The method of claim 3, wherein the steps of determining a carrier wave power and determining a carrier wave power-to-noise power spectral density, further comprise:
   computing a Fourier transform of the carrier wave; and
   computing a power spectrum of the Fourier transform of the carrier wave.

5. The method of claim 3, wherein the step of applying a Kalman filter to the carrier wave power further comprises:
   Kalman-filtering the carrier wave power;
   computing a residual carrier wave power from the carrier wave power and the Kalman-filtered carrier wave power;
   comparing the residual carrier wave power to a residual carrier wave power threshold; and
   applying noise to the carrier wave.

6. The method of claim 5, wherein the step of detecting a decrease in carrier wave power further comprises:
   comparing the Kalman-filtered carrier wave power to a carrier power threshold; and
   comparing the carrier power-to-noise power spectral density to a signal-to-noise threshold.

7. The method of claim 6, wherein the step of delaying a transmission of the carrier wave to a demodulator further comprises:
   delaying a transmission of the carrier wave to a demodulator when the Kalman-filtered carrier wave power is less than the carrier power threshold and the carrier power-to-noise power spectral density is less than the signal-to-noise threshold.

8. The method of claim 1, further comprising:
   demodulating the carrier wave.

9. A system for detecting carrier wave dropout, the system comprising:
   circuitry for receiving a carrier wave;
   circuitry for determining a carrier wave power;
   circuitry for applying a Kalman filter to the carrier wave power;
   circuitry for detecting a decrease in carrier wave power; and
   circuitry for delaying a transmission of the carrier wave to a demodulator.

10. The system of claim 9, further comprising:
    circuitry for applying a window function to the carrier wave.

11. The system of claim 9, further comprising:
    circuitry for determining a carrier wave power-to-noise power spectral density.

12. The system of claim 11, wherein the circuitry for determining a carrier wave power and circuitry for determining a carrier wave power-to-noise power spectral density further comprises:
    circuitry for computing a Fourier transform of the carrier wave; and
    circuitry for computing a power spectrum of the Fourier transform of the carrier wave.

13. The system of claim 11, wherein the circuitry for applying a Kalman filter to the carrier wave power further comprises:
    circuitry for Kalman-filtering the carrier wave power;
    circuitry for computing a residual carrier wave power from the carrier wave power and the Kalman-filtered carrier wave power;
    circuitry for comparing the residual carrier wave power to a residual carrier wave power threshold; and
    circuitry for applying noise to the carrier wave.

14. The system of claim 13, wherein the circuitry for detecting a decrease in carrier wave power further comprises:
    circuitry for comparing the Kalman-filtered carrier wave power to a carrier power threshold;
    circuitry for comparing the carrier power-to-noise power spectral density to a signal-to-noise threshold; and
    circuitry for delaying a transmission of the carrier wave to a demodulator.

15. The system of claim 14, wherein the circuitry for delaying a transmission of the carrier wave to a demodulator further comprises:
    circuitry for delaying a transmission of the carrier wave to a demodulator when the Kalman-filtered carrier wave power is less than the carrier power threshold and the carrier power-to-noise power spectral density is less than the signal-to-noise threshold.

16. The system of claim 9, further comprising:
circuitry for demodulating the carrier wave.

17. A computer readable medium comprising computer readable instructions stored thereon for execution by a processor to perform a carrier wave detection method, the method comprising the steps:
receiving a carrier wave;
determining a carrier wave power;
applying a Kalman filter to the carrier wave power;
detecting a decrease in carrier wave power; and
delaying a transmission of the carrier wave to a demodulator.

18. The computer readable medium of claim 17, further comprising:
applying a window function to the carrier wave.

19. The computer readable medium of claim 17, further comprising:
determining a carrier wave power-to-noise power spectral density.

20. The computer readable medium of claim 19, wherein the steps of determining a carrier wave power and determining a carrier wave power-to-noise power spectral density further comprise:
computing a Fourier transform of the carrier wave;
computing a power spectrum of the Fourier transform of the carrier wave.

21. The computer readable medium of claim 19, wherein the step of applying a Kalman filter to the carrier wave power further comprises:
Kalman-filtering the carrier wave power;
computing a residual carrier wave power from the carrier wave power and the Kalman-filtered carrier wave power;
comparing the residual carrier wave power to a residual carrier wave power threshold;
applying noise to the carrier wave.

22. The computer readable medium of claim 21, wherein the step of detecting a decrease in carrier wave power further comprises:
comparing the Kalman-filtered carrier wave power to a carrier power threshold;
comparing the carrier power-to-noise power spectral density to a signal-to-noise threshold;
delaying a transmission of the carrier wave to a demodulator.

23. The computer readable medium of claim 22, wherein the step of delaying a transmission of the carrier wave to a demodulator further comprises:
delaying a transmission of the carrier wave to a demodulator when the Kalman-filtered carrier wave power is less than the carrier power threshold and the carrier power-to-noise power spectral density is less than the signal-to-noise threshold.

24. The computer readable medium of claim 17, further comprising:
demodulating the carrier wave.

* * * * *